United States Patent Office 2,721,214
Patented Oct. 18, 1955

2,721,214
PROCESS FOR PRODUCING ACYLAMIDO DIOLS

Harvey D. Troutman, Royal Oak, Mich., assignor to Parke, Davis & Company, Detroit, Mich., a corporation of Michigan No Drawing. Application June 9, 1953,
Serial No. 360,600

9 Claims. (Cl. 260—562)

This invention relates to a new process for producing certain valuable acylamido diols. More particularly, the invention relates to a new process for producing 1-p-alkylmercapto-phenyl-2-acylamidopropane-1,3-diols having the formula,

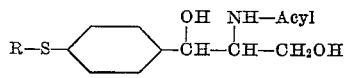

where R is a methyl or ethyl group and Acyl is a carboxylic acid acyl radical devoid of aqueous alkali sensitive substituents such as aliphatic halogen atoms, nitrite groups, ester groups and the like. For example, acyl may be a lower aliphatic acyl group, an alkoxy substituted lower aliphatic acyl group, a benzoyl group, an alkyl substituted benzoyl group, a nitro substituted benzoyl group, a ring halogenated benzoyl group, an alkoxy substituted benzoyl group, a phenacyl group, a nitro substituted phenacyl group, a ring halogenated phenacyl group, an alkyl substituted phenacyl group, an alkoxy substituted phenacyl group and the like. These products are valuable intermediates for the production of 1 - p - methylsulfonylphenyl - 2 - dichloroacetamidopropane-1,3-diol and 1-p-ethylsulfonylphenyl-2-dichloroacetamidopropane-1,3-diol which possess valuable therapeutic properties resembling those of the antibiotic chloramphenicol.

From the following description it will be apparent to those skilled in the art that the above products as well as the starting materials used in the process and intermediate products produced in the course of the process exist in both diastereoisomeric and optical forms. The terms "threo" and "erythro" will be used to distinguish the diastereoisomeric forms and the symbols (+) and (—) to designate the optical rotation of optically active substances. Because of the difficulty in representing these structural differences in graphic formulae the following convention will be used. Where no notation appears with the formula or chemical name the formula or chemical name is to be interpreted in its generic sense, that is, as representing any of the six possible isomers. Where a specific compound is intended the chemical name or formula will be given the appropriate notation designating which isomer is meant.

In accordance with the invention 1-p-alkylmercapto-phenyl-2-acylamidopropane-1,3-diols are produced by reacting a 1-p-aminophenyl-2-acylamidopropane-1,3-diol with nitrous acid in the presence of aqueous mineral acid to produce a mineral acid diazonium salt of 1-p-aminophenyl-2-acylamidopropane-1,3-diol, reacting the said diazonium salt with a metal salt of an alkyl xanthate in aqueous alkaline solution, hydrolyzing the alkyl xanthate of 1-phenyl-2-acylamidopropane-1,3-diol so obtained to the 1-p-mercaptophenyl-2-acylamidopropane-1,3-diol with alkali and alkylating the mercapto group. These transformations may be diagrammatically illustrated as follows:

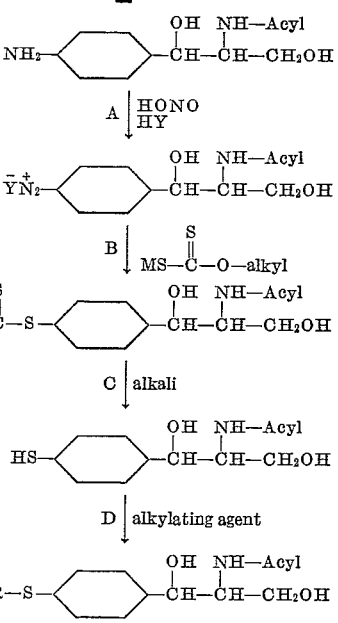

where HY is one equivalent of a mineral acid, Y is the anion of a mineral acid and R and Acyl have the same significance as given above.

In carrying out the first step of the process (A in the above diagram) a 1-p-aminophenyl-2-acylamidopropane-1,3-diol is subjected to the action of nitrous acid in the presence of aqueous mineral acid at a temperature below about 15° C and preferably at a temperature between —5° and +10° C. The nitrous acid for convenience is best generated in situ by the interaction of an alkali or alkaline earth nitrite with the mineral acid but, if desired, gaseous nitrogen trioxide, alkyl nitrites and nitrosyl compounds can also be used. To insure completion of the reaction an excess of nitrous acid is preferably used and the excess destroyed at the end of the reaction by adding urea or sulfamic acid to the reaction mixture. An excess of the mineral acid, that is, more than the amount necessary to react with the nitrous acid yielding agent and the one equivalent necessary to form the diazonium salt, is employed to eliminate or to minimize to a large extent the tendency of the diazonium salt compound to react with unchanged starting material. If desired, the mineral acid diazonium salt of the 1-p-aminophenyl-2-acylamidopropane-1,3-diol produced in this step of the process can be isolated but it is preferable to simply utilize the reaction mixture containing this product for the next step of the process.

The second step of the process (B in the above diagram) is carried out by reacting the mineral acid diazonium salt obtained in the first step of the process with a metal salt of an alkyl xanthate in aqueous alkaline solution. During the reaction the temperature is maintained between 30 and 100° C. and preferably in the range of 65 to 75° C. The product, the alkyl xanthate of the 1-phenyl-2-acylamidopropane-1,3-diol, separates from the reaction mixture as a yellow gum but when one operates within the preferred temperature range the mixture can be stirred without much difficulty and the decomposition of the intermediate product of the reaction proceeds smoothly. In carrying out the reaction it is preferable to employ an excess of the metal salt of the alkyl xanthate. Best results are obtained when an excess of 40 to 50% of the metal salt of the alkyl xanthate is used. As metal salts of the alkyl xanthate the alkali metal and alkaline earth metal salts of the lower alkyl xanthates are preferred. The reaction is carried out in an aqueous reaction medium containing sufficient alkali to neutralize the excess acid present in the diazonium salt solution and to render the reaction mixture slightly alkaline, that is, between about pH 7 to 9. The alkyl xanthate of the 1-phenyl-2-acylamidopropane-1,3-diol obtained by this method is sufficiently pure for use in the next step of the process without purification.

The third step of the process (C in above diagram) involves hydrolyzing the alkyl xanthate of the 1-phenyl-2-acylamidopropane-1,3-diol to the corresponding 1-p-mercaptophenyl-2-acylamidopropane-1,3-diol by treatment with aqueous alkali. In carrying out this reaction the temperature is maintained at 40 to 100° C. and the heating continued for approximately one-half to two hours depending upon the temperature. At least two equivalent but preferably about three to four equivalents of an alkali metal hydroxide are used as the alkali. However, if desired, up to about five equivalents of the alkali metal hydroxide may be used without causing a significant amount of hydrolysis of the N-acyl group. In order to hasten the reaction and provide a homogeneous reaction mixture it is preferable to use an aqueous solution of a lower aliphatic alcohol as the reaction medium.

The fourth step of the process (D in the above diagram) comprises the alkylation of the 1-p-mercaptophenyl-2-acylamidopropane-1,3-diol with a methylating or ethylating agent. This is accomplished by reacting the 1 - p - mercaptophenyl - 2 - acylamidopropane - 1,3-diol with a methyl or ethyl halide or sulfuric acid ester in an aqueous solution containing at least one equivalent of an alkali metal hydroxide. The reaction is carried by heating the reactants at a temperature between 50 and 100° C., preferably, in the neighborhood of about 65 to 85° C. Best results are obtained when an aqueous solution of a lower aliphatic alcohol is used as the reaction medium and a slight excess of the alkylating agent is employed.

The preferred method of carrying out the overall process is to carry out third and fourth step together, that is, to form the 1-mercaptophenyl-2-acylamidopropane-1,3-diol and simultaneously methylate or ethylate it. When using this modification the alkyl xanthate of 1-phenyl-2-acylamidopropane-1,3-diol is heated at a temperature between 50 and 100° C. with the alkylating agent in an aqueous alkaline solution. At least three and preferably about four to five equivalents of an alkali metal hydroxide are employed. Up to six equivalents of the alkali metal hydroxide can be used. The alkylating agent can be a methyl or ethyl halide or sulfuric acid ester and best results are obtained when slightly more than the theoretical amount is used. The reaction can be carried out in water but it is preferable to use an aqueous solution of a lower aliphatic alcohol as the reaction medium. The preferred reaction temperature is 65 to 85° C.

The invention is illustrated by the following examples.

Example 1

20.7 g. of sodium nitrite dissolved in 100 cc. of water is added slowly to a rapidly stirred suspension of 85.8 g. of D-(—)-threo-1-p-aminophenyl-2-benzamidopropane-1,3-diol in 75 cc. of hydrochloric acid (sp. gr. 1.18) and 375 cc. of water keeping the temperature of the mixture at 3-5° C. The reaction mixture is stirred for one hour and the excess nitrous acid destroyed by the addition of sulfamic acid to the solution until a starch-iodide paper test shows it contains no free nitrous acid. The reacton mixture is filtered keeping the temperature below 5° C. and the filtrate containing the desired diazonium chloride of D-(—)-threo-1-p-aminophenyl-2-benzamidopropane-1,3-diol used in the next step of the process.

The aqueous solution of the diazonium chloride of D - (—) - threo - 1 - p - aminophenyl - 2 - benzamidopropane-1,3-diol prepared above is added drop-wise to a well stirred solution of 41.4 g. of potassium carbonate and 75 g. of potassium ethyl xanthate in one liter of water keeping the temperature at 70 to 75° C. The reaction mixture is stirred at 70 to 75° C. for one-half hour, cooled to 10° C. and filtered. The crude product is washed with water, dried and boiled with 2.5 liters of benzene. The benzene solution is filtered while hot and the filtrate cooled to 10° C. The ethyl xanthate of D - (—) - threo - 1 - phenyl - 2 - benzamidopropane-1,3-diol which separates from the solution is collected, washed with benzene and dried; M. P. 129 to 132° C.; $[\alpha]_D^{26.5} = -84.5°$ (c=2% in alcohol). The formula of this product is,

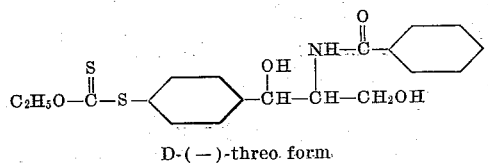

D-(—)-threo form 7 g. of potassium hydroxide in 14 cc. of water and 35 cc. of ethanol is added dropwise to a refluxing solution of 11.7 g. of the ethyl xanthate of D-(—)-threo-1-phenyl-2-benzamidopropane-1,3-diol and 5.12 g. of methyl iodide in 50 cc. of ethanol. The reaction mixture is refluxed for an additional four hours and the solvents removed by vacuum distillation. The residue is washed with water and recrystallized first from ethanol and then from ethyl acetate to obtain the desired D-(—)-threo-1-p-methylmercaptophenyl-2-benzamidopropane-1,3-diol in in pure form; M. P. 167–8° C.;

$[\alpha]_D^{26.5} = -106°$ (c=2% in alcohol)

The formula of this product is,

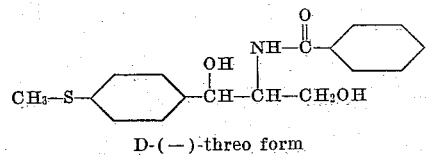

D-(—)-threo form

This same product can be obtained by substituting an equivalent amount of dimethylsulfate for the methyl iodide used in the above procedure.

Example 2

3.1 g. of sodium nitrite and 35 cc. of water is added slowly to a rapidly stirred suspension of 10 g. of D-(—)-threo - 1 - p - aminophenyl - 2 - acetamidopropane - 1,3-diol in 10 cc. of hydrochloric acid (sp. g. 1.18) and 70 cc. of water keeping the temperature of the mixture at 0 to 5° C. by the addition of cracked ice. The reaction mixture is stirred for an additional forty-five minutes at 0 to 5° C. and the excess nitrous acid decomposed by the addition of sulfamic acid solution until a starch iodide test for free nitrous acid is negative. The solution of the desired diazonium chloride of D-(—)-threo - 1 - p - aminophenyl - 2 - acetamidopropane - 1,3-diol so produced is used in the next step of the process.

The aqueous solution of the diazonium chloride of D - (—) - threo - 1 - p - aminophenyl - 2 - acetamidopropane-1,3-diol prepared above is added dropwise to a well stirred solution of 10.9 g. of potassium ethyl xanthate and 5 g. of potassium carbonate in 100 cc. of water keeping the temperature at 70 to 75° C. After the addition of the diazonium chloride solution has been completed the reaction mixture is stirred for an additional fifteen minutes at 70° C. and then cooled. The reaction mixture is extracted thoroughly with ethyl acetate, the ethyl acetate extracts combined and washed with saturated sodium chloride solution. After drying over anhydrous calcium sulfate the ethyl acetate is distilled to obtain an oily residue. The oily residue is stirred with isooctane to obtain a yellow solid which is composed principally of the ethyl xanthate of D-(—)-1- phenyl-2-acetamidopropane-1,3-diol which has the formula,

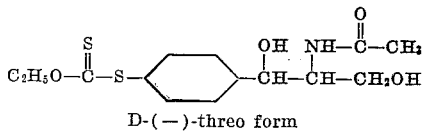

D-(—)-threo form

This product which also contains some D-threo-bis-(2-acetamido-1,3-dihydroxypropylphenyl) ester of dithiocarbonate is sufficiently pure for use in the next step of the process without further purification.

7 g. of potassium hydroxide in 14 cc. of water and 35 cc. of ethanol is added dropwise over a period of forty-five minutes to a refluxing solution of 11.7 g. of the ethyl xanthate of D-(—)-threo-1-phenyl-2-acetamidopropane-1,3-diol and 5.2 g. of methyl iodide in 50 cc. of ethanol. The reaction mixture is refluxed for an additional four hours and the solvents removed by vacuum distillation. The residue is washed with water and purified by recrystallization from ethanol to obtain the desired D - (—) - threo - 1 - p - methylmercaptophenyl-2-acetamidopropane-1,3-diol; M. P. 127–8° C. The formula of this product is,

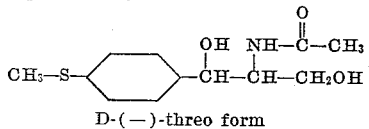

D-(—)-threo form

This same product can be obtained by substituting dimethyl sulfate for the methyl iodide used in the above procedure.

By substituting ethyl iodide for the methyl iodide used in the above alkylation one obtains D-(—)-threo-1-p-ethylmercaptophenyl - 2 - acetamidopropane - 1,3 - diol rather than D-(—)-threo-1-p-methyl-mercaptophenyl-2-acetamidopropane-1,3-diol.

*Example 3*

A solution of 6.5 g. of potassium hydroxide in 15 cc. of water and 50 cc. of ethanol is added to a suspension of 11.7 g. of the ethyl xanthate of D-(—)-1-phenyl-2-benzamidopropane-1,3-diol in 50 cc. of ethanol. The resulting brownish red solution is refluxed under nitrogen for two hours, cooled, and the solvent removed by distillation in vacuo. The pale yellow semi-solid residue is dissolved in 100 cc. of air-free water, the solution cooled to 5° C. and the cold solution acidified. The pale yellow solid which separates is collected, washed with air-free water and dried in vacuo. The product thus obtained is D - (—) - threo - 1 - p - mercaptophenyl - 2-benzamidopropane-1,3-diol of formula,

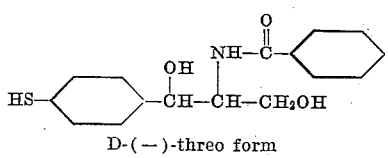

D-(—)-threo form 1.3 g. of dimethyl sulfate is added to a solution of 3 g. of D - (—) - threo - 1 - p - mercaptophenyl - 2-benzamidopropane-1,3-diol dissolved in 30 cc. of alcohol containing 0.5 g. of sodium hydroxide. The reaction mixture is refluxed for one hour, cooled, and neutralized to pH 7. The solvent is removed by distillation in vacuo, the residue washed with water and the product purified by recrystallization from ethanol and finally from ethyl acetate. The product so obtained is D-(—)-threo-1 - p - methylmercaptophenyl - 2 - benzamidopropane-1,3-diol; M. P. 167–168° C.

If one employs methyl iodide instead of dimethyl sulfate in the above procedure the same product is obtained.

*Example 4*

7 g. of potassium hydroxide in 14 cc. of water and 35 cc. of ethanol is added to a refluxing solution of 11.7 g. of the ethyl xanthate of D-(—)-1-p-phenyl-2-benzamidopropane-1,3-diol and 5.1 g. of diethyl sulfate in 50 cc. of ethanol. The resulting mixture is heated under reflux for an additional five hours and then the reaction mixture evaporated to dryness in vacuo. The residue is stirred with 50 cc. of water, cooled, and the mixture filtered. The crude product is washed with cold water, stirred with 5% hydrochloric acid, washed again with water and finally dried. The product thus obtained is D - (—) - 1 - p - ethylmercaptophenyl - 2 - benzamidopropane-1,3-diol of formula,

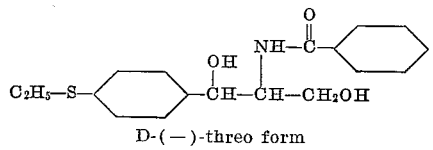

D-(—)-threo form

The product is purified by recrystallization from ethanol and then from ethyl acetate; M. P. 137 to 139° C.

The 1 - p - aminophenyl - 2 - acylamidopropane - 1,3-diols used as starting materials in the practice of the invention can be prepared by the catalytic reduction of the corresponding 1 - p - nitrophenyl - 2 - acylamidopropane-1,3-diols using, for example, a palladium on charcoal catalyst in a methanol solution and gaseous hydrogen under a pressure of about 50 pounds per square inch. The 1 - p - nitrophenyl - 2 - acylamidopropane-1,3-diols are well known products, see for example, U. S. Patent No. 2,483,885, issued October 4, 1949.

What I claim is:

1. Process for the production of a 1-p-alkylmercaptophenyl-2-acylamidopropane-1,3-diol of formula,

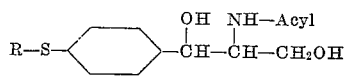

which comprises reacting a 1-p-aminophenyl-2-acylamidopropane-1,3-diol of formula,

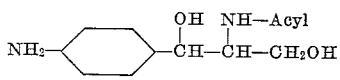

with nitrous acid in the presence of aqueous mineral acid thereby producing a diazonium salt of the 1-p-aminophenyl-2-acylamidopropane-1,3-diol of formula,

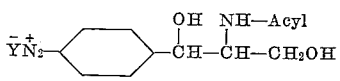

reacting said diazonium salt with a metal salt of an alkyl xanthate in aqueous alkaline solution thereby producing an alkyl xanthate of 1-phenyl-2-acylamidopropane-1,3-diol of formula,

hydrolyzing the said alkyl xanthate of 1-phenyl-2-acylamidopropane-1,3-diol to the corresponding 1-p-mercaptophenyl-2-acylamido-propane-1,3-diol of formula,

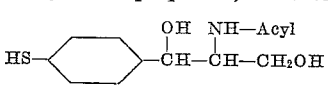

by treatment with aqueous alkali and reacting the 1-p-mercaptophenyl-2-acylamidopropane-1,3-diol with an alkylating agent to obtain said 1-p-alkylmercaptophenyl-2-acylamidopropane-1,3-diol, where R is lower alkyl, Y is an anion of a mineral acid and Acyl is a carboxylic acid acyl radical devoid of aqueous alkali sensitive substituents.

2. Process for the production of a 1-p-methylmercaptophenyl-2-acylamidopropane-1,3-diol of formula,

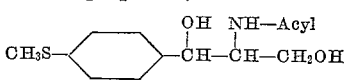

which comprises reacting a 1-p-aminophenyl-2-acylamidopropane-1,3-diol of formula,

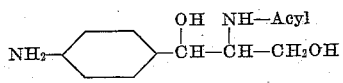

with nitrous acid in the presence of aqueous mineral acid at a temperature below 15° C. thereby producing a diazonium salt of the 1-p-aminophenyl-2-acylamidopropane-1,3-diol of formula,

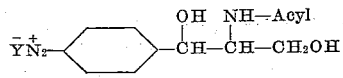

reacting said diazonium salt with an alkali metal salt of an alkyl xanthate in aqueous alkaline solution at a temperature between 30 and 100° C. thereby producing an alkyl xanthate of 1-phenyl-2-acylamidopropane-1,3-diol of formula,

hydrolyzing the said alkyl xanthate of 1-phenyl-2-acylamidopropane-1,3-diol to the corresponding 1-p-mercaptophenyl-2-acylamidopropane-1,3-diol of formula,

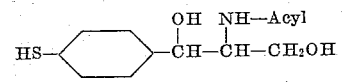

by treatment with not more than three equivalents of an alkali metal hydroxide in aqueous solution at a temperature between 40 and 100° C. and reacting the 1-p-mercaptophenyl-2-acylamidopropane-1,3-diol so obtained with a methylating agent of the class consisting of methyl halides and dimethyl sulfate in aqueous alkaline solution at a temperature between 50 and 100° C. to obtain said 1-p-methylmercaptophenyl-2-acylamidopropane-1,3-diol; where Y is an anion of a mineral acid and Acyl is a carboxylic acid acyl radical devoid of aqueous alkali sensitive substituents.

3. Process for the production of a 1-p-methylmercaptophenyl-2-acylamidopropane-1,3-diol of formula,

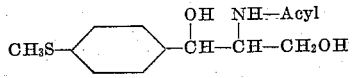

which comprises reacting a 1-p-aminophenyl-2-acylamidopropane-1,3-diol of formula,

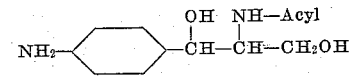

with nitrous acid in the presence of aqueous mineral acid at a temperature below 15° C. thereby producing a diazonium salt of the 1-p-aminophenyl-2-acylamidopropane-1,3-diol of formula,

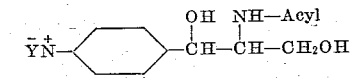

reacting said diazonium salt with an alkyl metal salt of an alkyl xanthate in aqueous alkaline solution at a temperature between 30 and 100° C. thereby producing an alkyl xanthate of 1-phenyl-2-acylamidopropane-1,3-diol of formula,

and heating the said alkyl xanthate of 1-phenyl-2-acylamidopropane-1,3-diol with three to six equivalents of an alkali metal hydroxide and a methylating agent of the class consisting of methyl halides and dimethyl sulfate in aqueous solution at a temperature between 50 and 100° C. to obtain said 1-p-methylmercaptophenyl-2-acylamidopropane-1,3-diol; where Y is an anion of a mineral acid and Acyl is a carboxylic acid acyl radical devoid of aqueous alkali sensitive substituents.

4. Process for the production of a 1-p-methylmercaptophenyl-2-acetamidopropane-1,3-diol of formula,

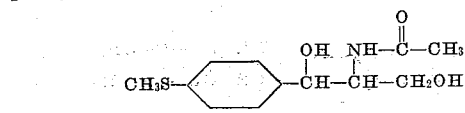

which comprises reacting a 1-p-aminophenyl-2-acetamidopropane-1,3-diol of formula,

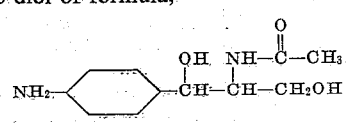

with nitrous acid in the presence of aqueous mineral acid at a temperature between −5 and +10° C. thereby producing a diazonium salt of the 1-p-aminophenyl-2-acetamidopropane-1,3-diol of formula,

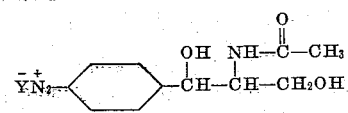

reacting said diazonium salt of an alkali metal salt of a lower alkyl xanthate in aqueous alkaline solution at a temperature between 65 and 75° C. thereby producing a lower alkyl xanthate of 1-phenyl-2-acetamidopropane-1,3-diol of formula,

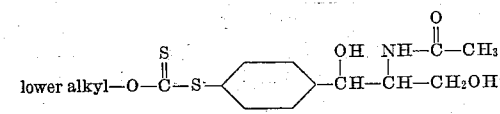

and heating said lower alkyl xanthate of 1-phenyl-2-acetamidopropane-1,3-diol with four to five equivalents of an alkali metal hydroxide and a methylating agent of the class consisting of methyl halides and dimethyl sulfate in aqueous solution at a temperature between 50 and 100° C. to obtain said 1-p-methylmercaptophenyl-2-acetamidopropane-1,3-diol; where Y is an anion of a mineral acid.

5. Process for the production of a 1-p-methylmercaptophenyl-2-benzamidopropane-1,3-diol of formula,

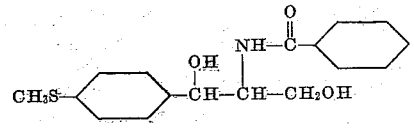

which comprises reacting a 1-p-aminophenyl-2-benzamidopropane-1,3-diol of formula,

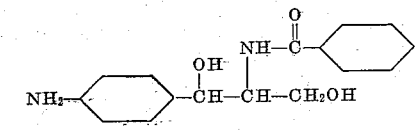

with nitrous acid in the presence of aqueous mineral acid at a temperature between −5 and +10° C. thereby producing a diazonium salt of the 1-p-aminophenyl-2-benzamidopropane-1,3-diol of formula,

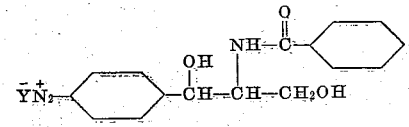

reacting said diazonium salt of an alkali metal salt of a lower alkyl xanthate in aqueous alkaline solution at a temperature between 65 and 75° C. thereby producing a lower alkyl xanthate of 1-phenyl-2-benzamidopropane-1,3-diol of formula,

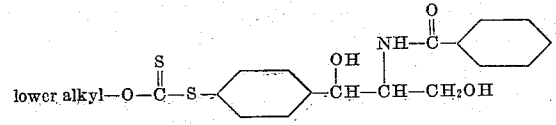

and heating said lower alkyl xanthate of 1-phenyl-2-benzamidopropane-1,3-diol with four to five equivalents of an alkali metal hydroxide and a methylating agent of the class consisting of methyl halides and dimethyl sulfate in aqueous solution at a temperature between 50 and 100° C. to obtain said 1-p-methylmercaptophenyl-2-benzamidopropane-1,3-diol; where Y is an anion of a mineral acid.

6. Process for the production of a 1-p-methylmercaptophenyl-2-benzamidopropane-1,3-diol of formula,

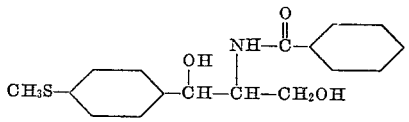

which comprises reacting a 1-p-aminophenyl-2-benzamidopropane-1,3-diol of formula,

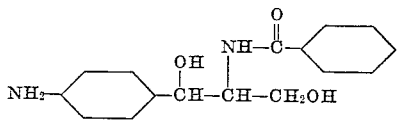

with nitrous acid in the presence of aqueous mineral acid at a temperature between —5 and +10° C. thereby producing a diazonium salt of the 1-p-aminophenyl-2-benzamidopropane-1,3-diol of formula,

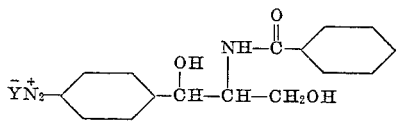

reacting said diazonium salt of an alkali metal salt of a lower alkyl xanthate in aqueous alkaline solution at a temperature between 65 and 75° C. thereby producing a lower alkyl xanthate of 1-phenyl-2-benzamidopropane-1,3-diol of formula,

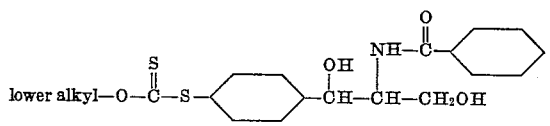

heating the said lower alkyl xanthate of 1-phenyl-2-benzamidopropane-1,3-diol with two to five equivalents of an alkali metal hydroxide in aqueous solution at a temperature between 40 and 100° C. thereby producing a 1-p-mercaptophenyl-2-benzamidopropane-1,3-diol of formula,

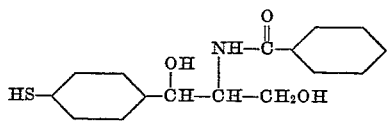

and reacting said 1-p-mercaptophenyl-2-benzamidopropane-1,3-diol with a methylating agent of the class consisting of methyl halides and dimethyl sulfate to obtain said 1-p-methylmercaptophenyl-2-benzamidopropane-1,3-diol; where Y is an anion of a mineral acid.

7. Process for the production of D-(—)-threo-1-p-methylmercaptophenyl - 2 - acetamidopropane-1,3-diol which comprises reacting D-(—)-threo-1-p-aminophenyl-2-aminopropane-1,3-diol with nitrous acid in the presence of aqueous hydrochloric acid at a temperature between —5 and +10° C. thereby producing the diazonium chloride of D-(—)-threo-1-p-aminophenyl-2-acetamidopropane-1,3-diol, reacting said diazonium salt with an alkali metal salt of ethyl xanthate in aqueous alkaline solution at a temperature between 65 and 75° C. thereby producing the ethyl xanthate of D-(—)-threo-1-phenyl-2-acetamidopropane-1,3-diol and heating said ethyl xanthate of D-(—)-threo-1-phenyl-2-acetamidopropane-1,3-diol with four to five equivalents of an alkali metal hydroxide and a methylating agent of the class consisting of methyl halides and dimethyl sulfate in aqueous solution at a temperature between 65 and 85° C. to obtain said D-(—)-threo-1-p-methylmercaptophenyl-2-acetamidopropane-1,3-diol.

8. Process for the production of D-(—)-threo-1-p-methylmercaptophenyl - 2 - benzamidopropane - 1,3 - diol which comprises reacting D-(—)-threo-1-p-aminophenyl-2-aminopropane-1,3-diol with nitrous acid in the presence of aqueous hydrochloric acid at a temperature between —5 and +10° C. thereby producing the diazonium chloride of D-(—)-threo-1-p-aminophenyl-2-benzamidopropane - 1,3 - diol, reacting said diazonium salt with an alkali metal salt of ethyl xanthate in aqueous alkaline solution at a temperature between 65 and 75° C. thereby producing the ethyl xanthate of D-(—) - threo - 1 - phenyl - 2 - benzamidopropane - 1,3 - diol and heating said ethyl xanthate of D-(—)-threo-1-phenyl-2-benzamidopropane-1,3-diol with four to five equivalents of an alkali metal hydroxide and a methylating agent of the class consisting of methyl halides and dimethyl sulfate in aqueous solution at a temperature between 65 and 85° C. to obtain said D-(—)-threo-1-p-methylmercaptophenyl-2-benzamidopropane-1,3-diol.

9. Process for the production of D-(—)-threo-1-p-methylmercaptophenyl - 2 - benzamidopropane - 1,3 - diol which comprises reacting D-(—)-threo-1-p-aminophenyl-2-aminopropane-1,3-diol with nitrous acid in the presence of aqueous hydrochloric acid at a temperature between —5 and +10° C. thereby producing the diazonium chloride of D-(—)-threo-1-p-aminophenyl-2-benzamidopropane-1,3-diol, reacting said diazonium salt with an alkali metal salt of ethyl xanthate in aqueous alkaline solution at a temperature between 65 and 75° C. thereby producing the ethyl xanthate of D - (—) - threo - 1 - phenyl - 2 - benzamidopropane - 1,3-diol, heating said ethyl xanthate of D-(—)-threo-1-phenyl-2-benzamidopropane-1,3-diol with three to four equivalents of an alkali metal hydroxide in aqueous solution at a temperature of 40 to 100° C. thereby producing D-(—)-threo-1-p-mercaptophenyl-2-benzamidopropane-1,3-diol and heating said D-(—)-threo-1-p-methylmercaptophenyl - 2 - benzamidopropane - 1,3 - diol with a methylating agent of the class consisting of methyl halides and dimethyl sulfate in aqueous alkaline solution at a temperature between 65 and 85° C. to obtain said D-(—)-threo-1-p-methylmercaptophenyl-2-benzamidopropane-1,3-diol.

References Cited in the file of this patent

"Organic Synthesis," Shriner Wiley and Sons, N. Y. (1947), vol. 27, pp. 81–83.